May 5, 1925.  1,536,746
C. W. ARMBRUST
DEVICE FOR MAKING WATER
Filed March 25, 1918   2 Sheets-Sheet 1
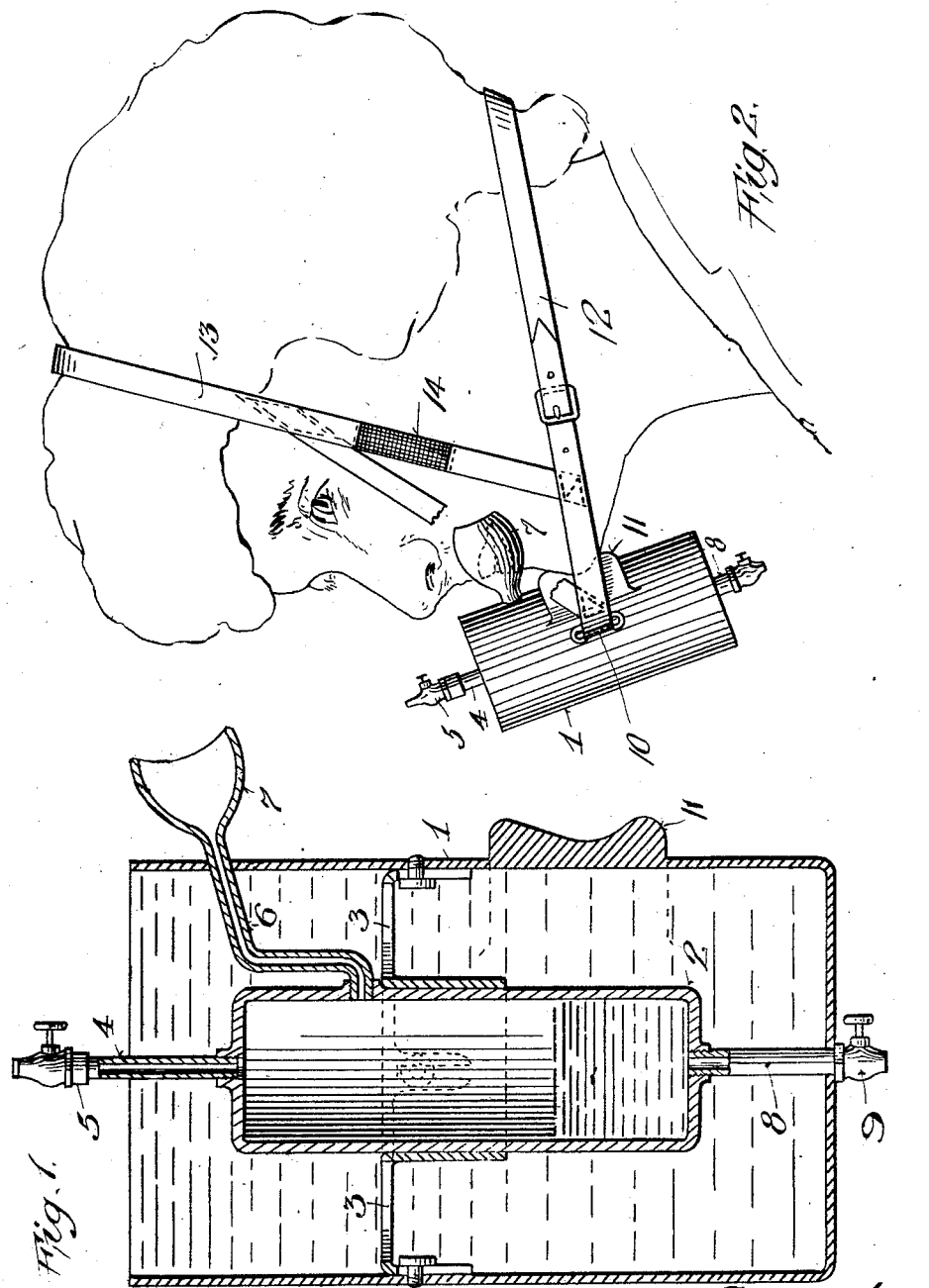

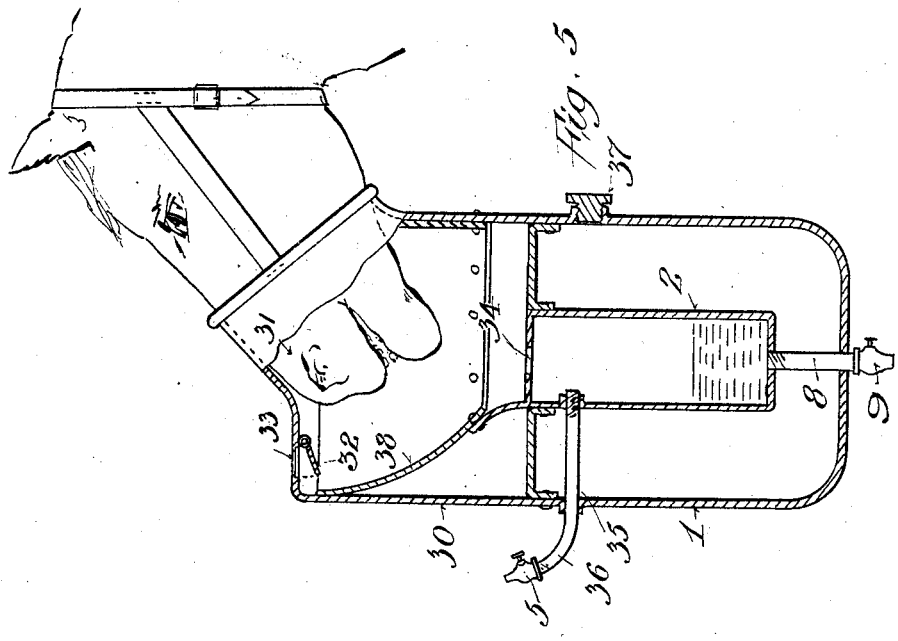
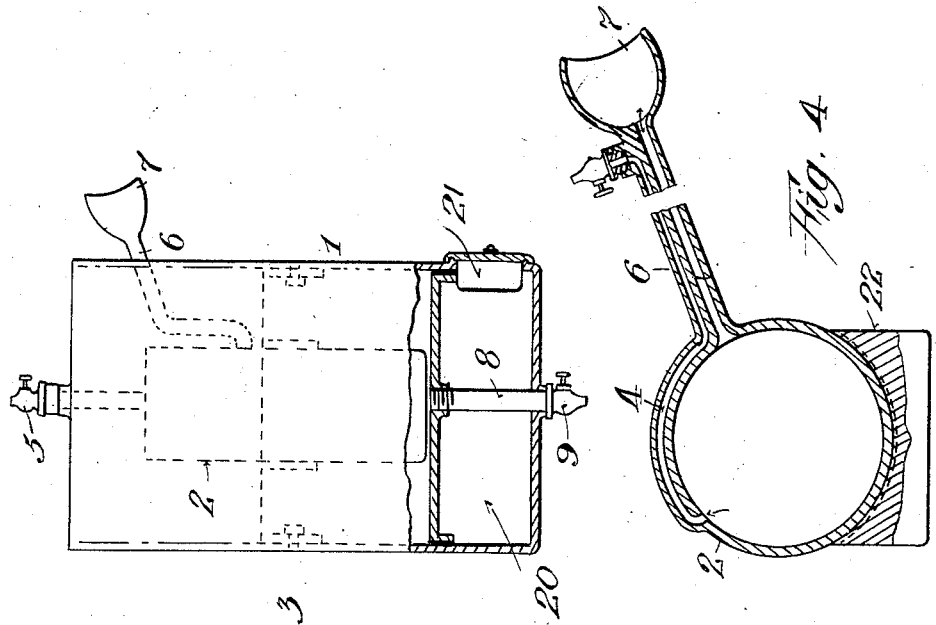

Patented May 5, 1925.

1,536,746

UNITED STATES PATENT OFFICE.

CHARLES W. ARMBRUST, OF ALBANY, NEW YORK, ASSIGNOR TO CHARLES H. JOCKMUS, DOING BUSINESS UNDER THE NAME OF ANSONIA MANUFACTURING COMPANY, OF ANSONIA, CONNECTICUT.

DEVICE FOR MAKING WATER.

Application filed March 25, 1918. Serial No. 224,697.

*To all whom it may concern:*

Be it known that I, CHARLES W. ARMBRUST, a citizen of the United States, residing at Albany, in the county of Albany, State of New York, have made a certain new and useful Invention in Devices for Making Water, of which the following is a specification.

This invention relates to a device for manufacturing water.

The object of the invention is to provide a device for manufacturing water, which is simple in construction, efficient in operation, and economical of manufacture.

A further object of the invention is to provide a device of the character described, which will enable one to manufacture water for drinking or other purposes, out of the atmosphere.

A further object of the invention is to provide a device of the character described which utilizes the exhalation of the animal and human breath for the purpose of manufacturing water for drinking or other purposes.

Further objects of the invention will appear more fully hereinafter.

The invention consists substantially in the construction, combination, location and relative arrangement of parts, all as will be more fully hereinafter set forth, as shown by the accompanying drawings and finally pointed out in the appended claims.

Referring to the drawings:—

Fig. 1 is a view in section of a water manufacturing device embodying my invention.

Fig. 2 is a view in perspective showing the application of the same when in use.

Fig. 3 is a view in side elevation partly in section of a modified construction embodying my invention.

Fig. 4 is a view in section of a still further modified construction embodying my invention.

Fig. 5 is a view in section showing application of the device embodying my invention to an animal, in this instance, a horse.

The same part is designated by the same reference numeral wherever it occurs throughout the several views.

It is well established that breath or respiration is a function common to all living animals and consists of the taking in of oxygen and throwing off the products of oxidation of the tissues, which products consist mainly of water, and to a small extent of carbondioxide. Most people breathe from sixteen to twenty-four times per minute. In an adult human when the lungs have been emptied as much as possible of air, they still contain about forty cubic inches of air. They are capable of inhaling as much as two hundred and forty cubic inches of air, making a total of two hundred and eighty cubic inches. The amount of water contained in the expiratory action of the lungs, it is well established, may be increased by proper exercise and by the proper position of the body.

It is among the special purposes of my present invention to provide a device of the character described which may form part of the standard life saving equipment on vessels at sea or other body of water, or which may be used effectively in desert places where nights or days, or both, are cool, or where there may be an impure or undrinkable water supply, and which therefore may form a part of the standard equipment of the soldier in the trenches or elsewhere, or of explorers, or any one who may be placed in a situation without a drinkable water supply to insure at all times a sufficient supply of water for drinking to prevent any animal or human from suffering or dying from thirst. In accordance with my invention I utilize the moisture contained in the human breath for the manufacture of the water and obtain the same by condensing the moisture out of the breath. I also propose to employ the same principle in connection with animals. This may be accomplished in any number of ways, and while I have shown and will now describe several simple and efficient means for accomplishing same, I wish it to be understood that my invention is not to be limited or restricted thereto.

In accordance with the illustration forming part hereof as one form of achieving the objects of my invention, I subject the human or animal breath of exhalation to a temperature colder than the breath and sufficient to cause condensation thereof required to obtain a great part, if not all, of the moisture therein.

I also suitably store the water thus obtained until the same is to be utilized.

Referring to the drawings, I show a simple device embodying my invention wherein 1 indicates a container made of any suitable material, (for example, a suitable metal) open at its top; within the container I mount a closed vessel 2 of smaller size than the container and adapted to be completely inclosed thereby. The vessel 2 can be supported within the container in any suitable manner, for example by means of the supporting strips 3 carried by the container 1. The vessel 2 may be of any suitable material preferably of glass and is completely sealed except for a vent 4, which extends through the open end of the container 1. While I do not desire to be limited or restricted to this detail, I find it preferable to locate the vent 4 in the top of the vessel 2. If desired, the vent 4 may be provided with a removable cover 5, as shown. The vessel 2 is also provided with a second vent 6 located preferably between the ends of the vessel 2, which vent may be suitably located at any portion of the container 1, but for the purpose of illustration, I have shown the same as extending through the side wall of the vessel 1, and terminating in the mouth piece 7. The mouth piece, if desired, may be made of sufficient size to completely inclose the mouth of the one using the device. It will be noticed that the relative sizes in the vessel and container are such that a comparatively large chamber is secured between the vessel and the container, which chamber may be filled with any suitable cooling medium, for example, ordinary sea-water. This sea-water which may be filled to the top of the container 1, will maintain the vessel 2 completely surrounded with a cooling medium lower than the temperature of the breath of exhalation. One using the device will exhale his breath through the mouth piece 7 into the vessel 2, the sudden drop of temperature of the breath caused by its impact against the comparatively cold vessel 2, causes condensation of the moisture contained in the breath, which moisture will collect at the bottom of the vessel 2, as indicated. It is known that to obtain condensation that either a sudden cooling of the vapor or pressure thereon or both may be utilized. In accordance with my invention, I provide the comparatively cold vessel 2 with means for obtaining adjustable pressure within the said vessel. This may be accomplished in any suitable or desired manner, and I therefore do not desire to be limited or restricted to the specific form shown wherein the removable cap 5 for the vent 4 is made in the form of a valve, which may be opened or closed to any desired degree to allow either a full opened vent 4 or one restricted as desired. Inasmuch as carbondioxide is included in the exhalation of the breath, it is desirable to have the vent 4 opened at least to a small degree. This will afford an egress for the carbondioxide gas from the interior of the vessel 2, at the same time maintaining a pressure on the vapor contained in the vessel 2. Furthermore, when the vent 4 is opened completely it may be utilized for the purposes of drawing off the water of condensation obtained in accordance with my invention. If desired, however, but to which I do not desire to be limited or restricted, the third vent 8 provided with a stopcock 9 may be provided on the bottom of the vessel 2 extending through the bottom of the container 1 for this purpose. If desired, a water-making device as a unit thus far described may be provided with suitable attaching bands for fixing the same in place over the mouth of one using the same as indicated in Figure 2 for which purpose the container 1 may be provided with a lug 10 to which a strap 12 is secured adapted to be adjustably secured around the head of one using the device. If desired, the strap 12 may be provided with an extension 13 preferably with an elastic portion 14 extending over the head of the user. In addition, if desired, the container 1 may be provided with a chin rest 11 to hold the same in place with the mouth piece 7 over the mouth of the person using the device.

For an illustration of the use of the device, if one shipwrecked fills the chamber between the container 1 and the vessel 2 with ordinary sea water, which is considerably cooler than the temperature of the breath of exhalation and straps the device around the head as indicated in Fig. 2 so that the process of inhaling through the nostrils and exhaling through the mouth is thus unconsciously and continuously carried out even a short time the vessel 2 will contain a considerable amount of water suitable for drinking or other purposes which may be utilized in an emergency to quench thirst and to save life. I have found by experimentation that in a short time it is possible to obtain a comparatively large amount of water within the vessel 2, the amount so manufactured being controllable by the posture of the body, the amount of exercise, the amount of pressure and the degree of coldness of the vessel 2. The liquid thus obtained is transparent, colorless, tasteless, and noninjurious, and has the effect of efficiently quenching the thirst. If desired any disinfecting or purifying material such as chlorate of lime or bicarbonate of soda may be dropped into the water through the vent 4 prior to utilizing same for drinking or other purposes. If desired, and as shown in Fig. 3, the bottom of the vessel 1 may be provided with a chamber 20, which chamber 20 may be utilized for storing food in compact form. Any suitable construction of chamber may be employed, and while I have shown for the purpose of illustration a door 21 for allowing the food to be placed in the chamber 20 and removed therefrom. I do not desire to be limited or restricted to this specific structure. It is understood of course that the chamber 20 is preferably water-tight. In Fig. 4 I show a modified arrangement wherein the vessel 2 which as above stated may be of any shape is not provided with the outside container 1 but is provided with any suitable weight indicated generally at 22. In this form the inlet duct 6 communicates with the mouth piece 7 which may be adapted to be strapped in position over the mouth of the user as indicated in Fig. 2. The outlet vent 4 runs in a course parallel to the inlet duct 6 and is open to the atmosphere at any suitable point below the mouth piece 7. The respective ducts 6 and 4 are of any suitable or desired length. The purpose of this structure being to eliminate the outside container 1 and allow the same to be positioned, for example over the stern of a boat, the weight 22 being sufficient to overcome the natural buoyancy of the container and to hold same under the surface of the water with the inlet duct 6 of such length to extend to the mouth of the user sitting in the boat in a suitable or comfortable position. This form of the invention may also readily be applied for use in the desert wherein the device may be buried in the ground a sufficient distance to insure a temperature surrounding the vessel 2 of a cooler degree than the temperature of the breath of exhalation for either animal or man, as will readily be apparent. In Fig. 5 I show a structure adapted for use in connection with an animal, in this instance selected for the purpose of illustration, a horse. In this instance the device forms part of what I will term a nose-bag indicated generally at 30 adapted to fit over the nose and mouth of a horse or other animal indicated at 31. The nose-bag 30 is provided with a flat valve 32 hinged thereto to normally allow inhalation through the port 33 but which will close preventing the escape of the breath of exhalation through the port 33 when the animal exhales, thereby forcing the breath of exhalation through the port 34 into the vessel 2 which is surrounded by the chamber 35 adapted to be filled with the cooling medium, as explained in connection with Fig. 1. It is understood, of course, that the chamber 35 is completely shut off from the nose-bag portion of the device. The vent 36 passes through the wall of the device 30 as shown and is provided with the usual stopcock 5 to allow regulation of pressure and the discharge of the breath. The container 30 is provided with a cap 37 to allow the chamber 35 to be filled with the cooling medium if this form of device is employed. Likewise to insure the breath of exhalation rapidly finding its way to the port 34 leading into chamber 2 a suitable baffle plate 38 leading the breath of exhalation to the port may be utilized as shown. Many other modifications and details will readily occur to others with knowledge acquired from the present invention without departing from the spirit and scope of my invention as defined in the claims, therefore, having now set forth the objects and nature of my invention, what I claim as new and useful and of my own invention and desire to secure by Letters Patent, is:—

1. The combination with a container of a vessel located therein to form a space therebetween to accommodate a cooling medium therein, a vent for said vessel and a supply tube to said vessel, and a mouth piece for said supply tube, and means for securing said container to the head of a person or animal.

2. The combination with a container of a vessel located therein to form a space therebetween to accommodate a cooling medium therein, a vent for said vessel and a supply tube to said vessel, and a mouth piece for said supply tube, and adjustable straps secured to said container for securing the same to the head of a person or animal.

In testimony whereof I have hereunto set my hand on this 21st day of March A. D. 1918.

CHARLES W. ARMBRUST.